United States Patent
Tung et al.

(10) Patent No.: US 9,123,177 B2
(45) Date of Patent: Sep. 1, 2015

(54) THREE DIMENSIONAL PROCESSING CIRCUIT AND PROCESSING METHOD

(75) Inventors: Hsu-Jung Tung, Taoyuan County (TW); Chia-Wei Yu, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 820 days.

(21) Appl. No.: 13/159,995

(22) Filed: Jun. 14, 2011

(65) Prior Publication Data

US 2011/0310095 A1     Dec. 22, 2011

(30) Foreign Application Priority Data

Jun. 18, 2010   (TW) ................................ 99119823 A

(51) Int. Cl.
*G06T 15/00*   (2011.01)
*G06T 15/50*   (2011.01)
*H04N 13/00*   (2006.01)

(52) U.S. Cl.
CPC ............ *G06T 15/503* (2013.01); *H04N 13/004* (2013.01); *H04N 13/007* (2013.01)

(58) Field of Classification Search
CPC ............................. G06T 7/0075; G06T 7/0081
USPC ................. 345/419, 431; 348/43; 382/154
See application file for complete search history.

(56) References Cited

U.S. PATENT DOCUMENTS 7,054,478 B2 *   5/2006   Harman ...................... 382/154

FOREIGN PATENT DOCUMENTS

| CN | 1174473 A   | 2/1998 |
|----|-------------|--------|
| CN | 1281569 A   | 1/2001 |
| CN | 101653011 A | 2/2010 |
| TW | 200935873 A | 8/2009 |

OTHER PUBLICATIONS

State Intellectual Property Office of the People's Republic of China, "Office Action", China, May 2, 2013.
Intellectual Property Office, Ministry of Economic Affairs, R.O.C., "Office Action", Apr. 10, 2014, Taiwan.

* cited by examiner

*Primary Examiner* — Phu K Nguyen
(74) *Attorney, Agent, or Firm* — Morris, Manning & Martin, LLP

(57) ABSTRACT

A three dimensional processing circuit and processing method is disclosed. In the present invention, a key depth is obtained to change an OSD location by analyzing the key image information in the 3D image. Therefore, the disadvantages of the conventional 3D processing circuit and processing method are fixed so as to decrease fatigue of user's eyes.

22 Claims, 10 Drawing Sheets

THREE DIMENSIONAL PROCESSING CIRCUIT AND PROCESSING METHOD

CROSS-REFERENCE TO RELATED APPLICATION

This non-provisional application claims priority under 35 U.S.C. §119(a) on Patent Application No. 099119823 filed in Taiwan (R.O.C.) on Jun. 18, 2010, the entire contents of which are hereby incorporated by reference.

BACKGROUND OF THE INVENTION

1. Field of the invention

The present invention relates to a three dimensional processing circuit and processing method, more particularly, a three dimensional processing circuit and processing method for determining the location of on-screen display (OSD) according to the imaging depth.

2. Description of the Prior Arts

The three dimensional (3D) image is generated by depth calculation, dual-lens recording or other ways. Users can enjoy watching the 3D image after wearing the special 3D glasses and adding a scene depth to a two dimensional (2D) plane. However, the OSD information is generally extra information, for example, the subtitle. In other words, the OSD itself does not have depth information. There are two display ways respectively showed in the FIGS. 1A and 1B (given an instance of the subtitle) in a conventional OSD.

FIG. 1A illustrates operating situations of a key point 10a and the subtitle 11a in the conventional 3D image. The subtitle 11a doesn't do any processing that have relation with depth, so the location of the subtitle 11a watched by dual-eyes is same in the 3D image, and in the version effect, equivalent to the location of the letter in the actual screen. However, the subtitle 11a is needed to display on the top layer of the frame, resulting in the distant image eclipses the near image when user watching the subtitle 11a. As shown in the upper right corner of FIG. 1A, this situation is infringed the experience of daily life, causing by increasing fatigue of user's eye when user watches the 3D image (for example, the 3D film).

FIG. 1B illustrates other operating situations of the key point 10a and the subtitle 11a in the conventional 3D image. The location of subtitle 11a is fixed in the minimum depth in the overall 3D image so as to eclipse the other objects in real state. This way mentioned accords the experience of daily life and the subtitle looks better. However, taking the 3D film as an example, the key point 10b of 3D image sometime is not located on the front of the shallow depth, but it is located on the front of the deep depth. Therefore, the user must simultaneity watch the distant focus and the near subtitle 11b fixed. In other words, the user needs constantly adjust the focal length looked by double-eyes so as to increase fatigue of user's eye.

Accordingly, in view of the above drawbacks, it is an imperative that an apparatus and method are designed so as to solve the drawbacks as the foregoing.

SUMMARY OF THE INVENTION

In view of the disadvantages of prior art, the primary object of the present invention is to solve the disadvantages in the conventional 3D processing circuit and processing method for decreasing fatigue of user's eyes.

According to another object of the present invention, a 3D processing apparatus is provided.

The present invention provides an three dimensional (3D) processing circuit, configured to process an original 3D image for generating a 3D image, comprising: an image analyzing device, for analyzing the original 3D image to obtain key information of the original 3D image and outputting a key depth according to the key information; an on-screen display (OSD) determining device, coupled to the image analyzing device, for determining an OSD location according to the key depth and then generating an OSD with depth according to the OSD location; and a superimposing device, coupled to the OSD determining device, for superimposing the original 3D image and the OSD with depth to generate the 3D image.

The present invention provides an three dimensional (3D) processing method for processing an original 3D image to generate a 3D image, the method comprising: receiving an original image; analyzing the original 3D image for obtaining information of the original 3D image and outputting a key depth according to the key information; determining an OSD location according to the key depth and generating an OSD with depth; and superimposing the original 3D image and the OSD with depth to generate the 3D image.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the detailed description given herein below and the accompanying drawings which are given by way of illustration only, and thus are not limitative of the present invention and wherein.

DESCRIPTION OF THE EXEMPLARY EMBODIMENTS

The following descriptions are of exemplary embodiments only, and are not intended to limit the scope, applicability, or configuration of the invention in any way. Rather, the following description provides a convenient illustration for implementing exemplary embodiments of the invention. Various changes to the described embodiments may be made in the function and arrangement of the elements described. For your esteemed members of reviewing committee to further understand and recognize the fulfilled functions and structural characteristics of the invention, several exemplary embodiments cooperating with detailed description are presented as the follows.

Figure 1:
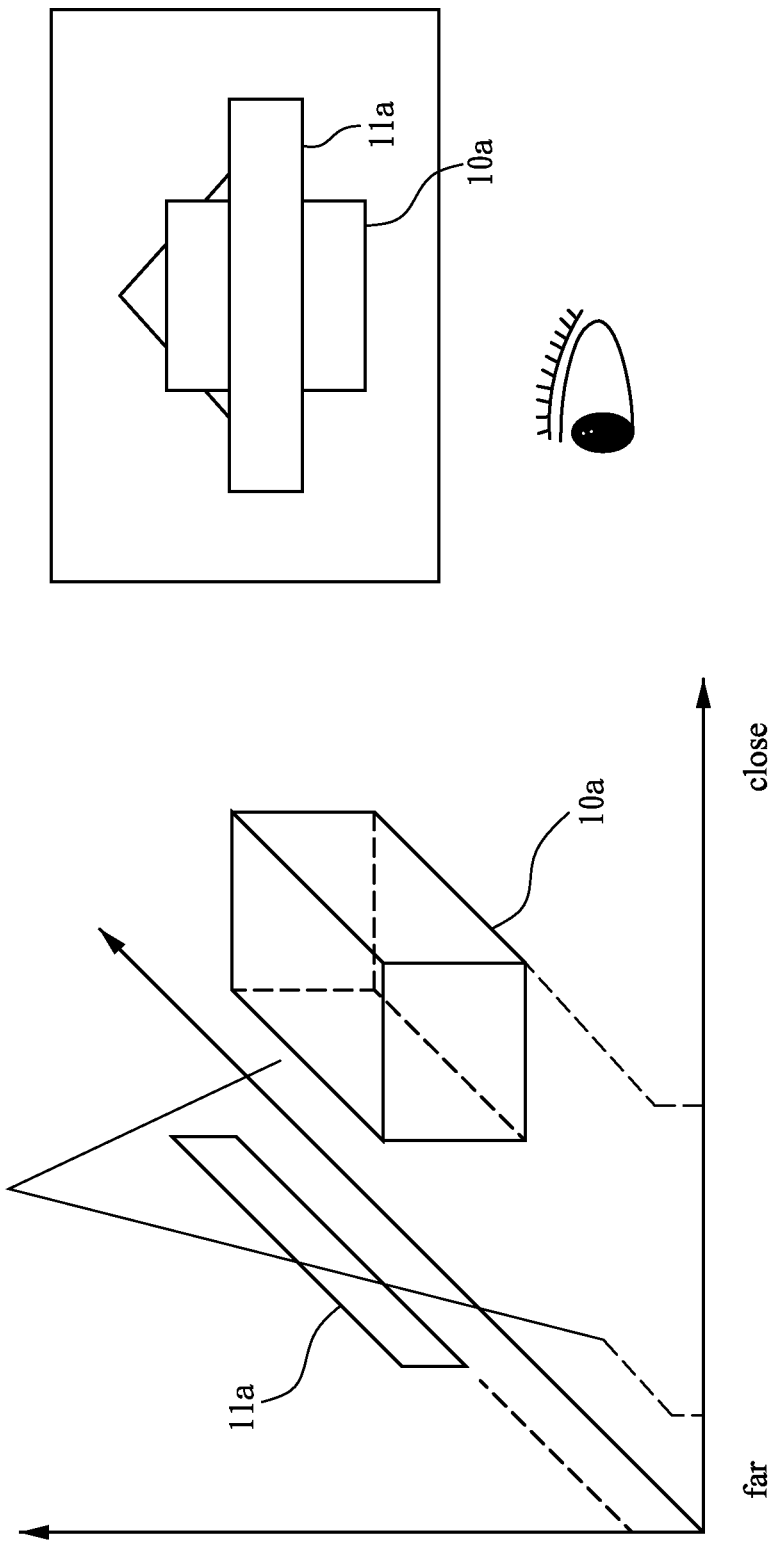
FIG. 1A illustrates operating situations of a key point and the subtitle in the conventional 3D image.
FIG. 1B illustrates other operating situations of the key point and the subtitle in the conventional 3D image.
Figure 1:
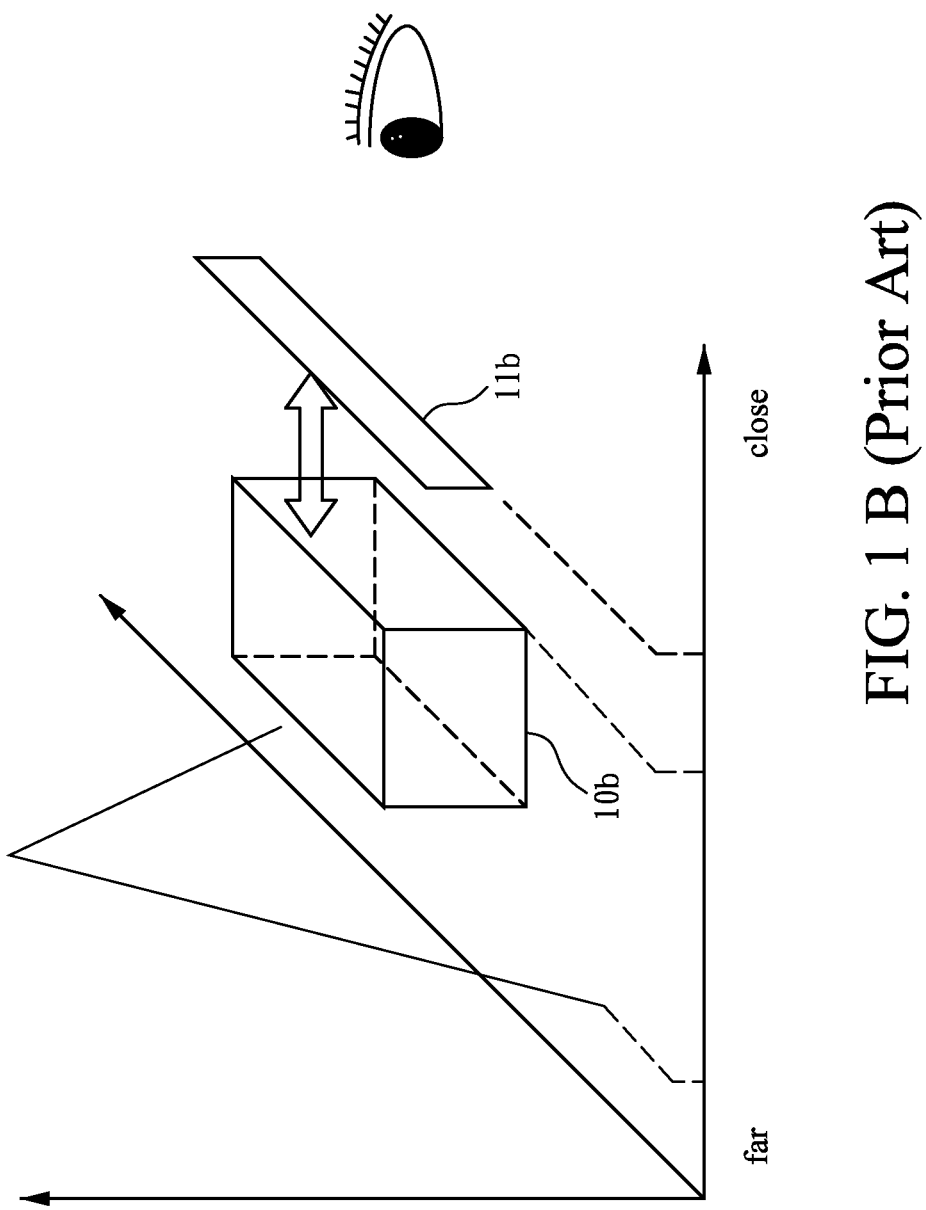
Figure 2:
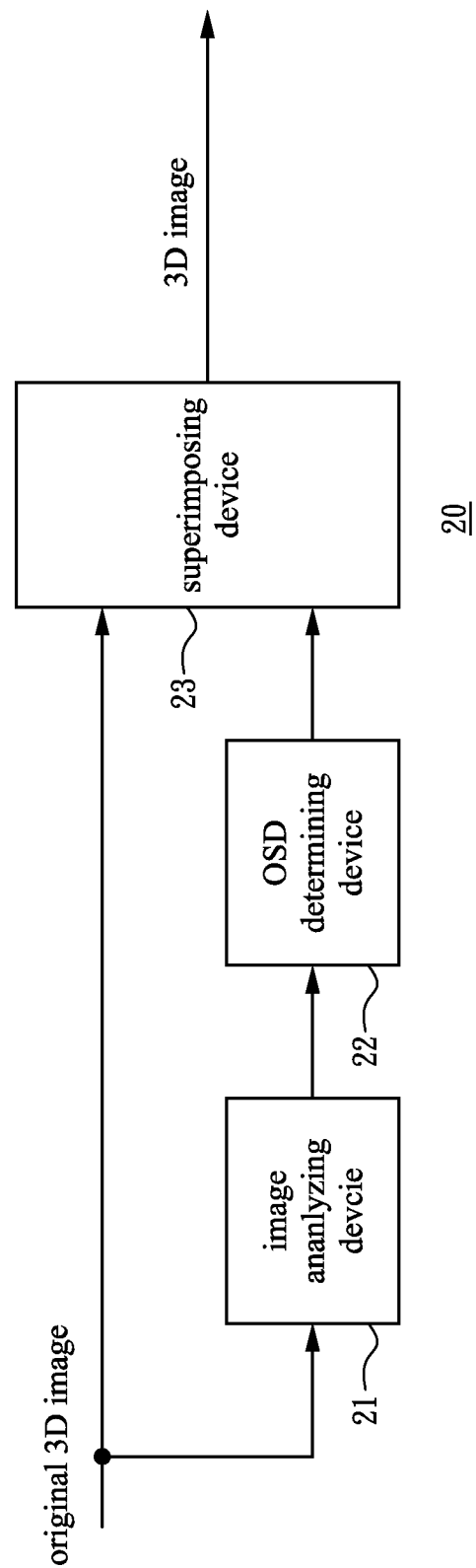
FIG. 2 illustrates a block diagram of the 3D processing circuit according to one embodiment of the present invention.

FIG. 2 illustrates a block diagram of the 3D processing circuit according to one embodiment of the present invention. The 3D processing circuit 20 may receive an original 3D image. The image analyzing device 21 included in the 3D processing circuit 20 searches out the key depth of the original 3D image according to the original 3D image. The image analyzing device 20 is implanted by many ways, for example, obtaining the key depth of the original 3D image by detecting the sharpness and color saturation of the original 3D image or according to the moving speed of object in the original 3D image, and then determining the OSD depth to generate a 3D image. In the embodiment, the major moving object in the original 3D image is detected to determine the key depth. In an embodiment, the major moving object is in the original 3D image, for example, a moving person in a static scene is determined as the key information and the key depth is output according to the key information. In another embodiment, a static object relative to the frame background is searched out in the frame background of fast-moving, for example, a car on the move is determined as the key information for outputting the key depth. The OSD determining device 22 determines the depth of the OSD (for example subtitle) according to the key depth after determining the key depth. The OSD determining device 22 calculates and generates the appropriate image format of the OSD with depth according to the image format of the original 3D image and then the superimposing device 23 superimposes the OSD with depth to the original 3D image for generating the 3D image with adjustable depth OSD. Therefore, the adjustable depth OSD is adjusted with the key point in the 3D image, and the user's eyes don't adjust the visual focus so as to decrease fatigue of user's eyes when the user watches the 3D image. In the embodiment, OSD is a subtitle, which is separated from the original by an OSD separating device (not shown in), and the subtitle is provided to the OSD determining device 22 for performing the renewal process. In other embodiments, the OSD is a control selection menu, which is generally generated by an OSD generator of the display, and the OSD is immediately provided from the OSD generator to the OSD determining device 22. The skilled person in the art should understand the OSD source is changed according to the image source and the application device, so the OSD source has various modifications. Herein, it does not discuss the OSD source described in detail.

Figure 3:
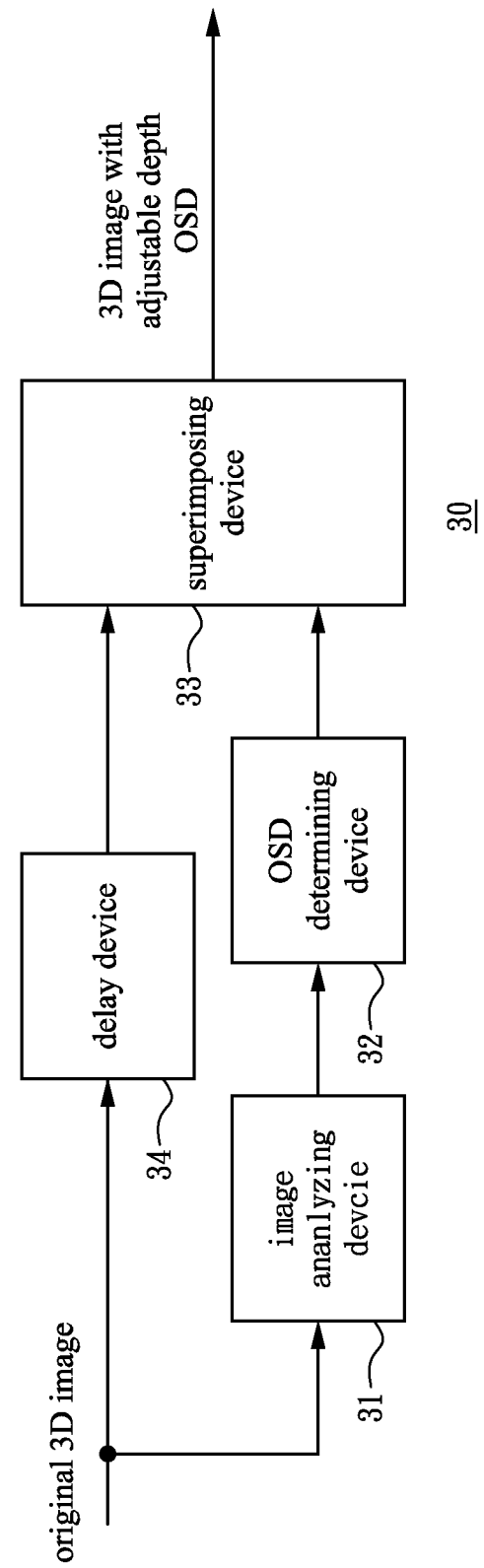
FIG. 3 illustrates a block diagram of a 3D processor circuit according to another embodiment of the present invention.

FIG. 3 illustrates a block diagram of a 3D processor circuit according to another embodiment of the present invention. The 3D processor circuit 30 may receive an original 3D image. The image analyzing device 30 included in the 3D processor circuit analyzes the original 3D image for searching out the key information of the original 3D image and outputting a key depth according to the key information. The OSD determining device 32 determines the depth of the OSD according to the key depth, and calculates and generates the OSD with depth according to the image format of the original 3D image. Subsequently, the superimposing device 33 superimposes the OSD with depth into the original 3D image so as to generate the 3D image with adjustable depth OSD. Furthermore, the present invention further includes a delay device 34, which is coupled to the superimposing device 33, delays the original 3D image for a time and then provides the original 3D image to the superimposing device 33 for properly superimposing the 3D image into the OSD so as to generate the 3D image.

Figure 4:
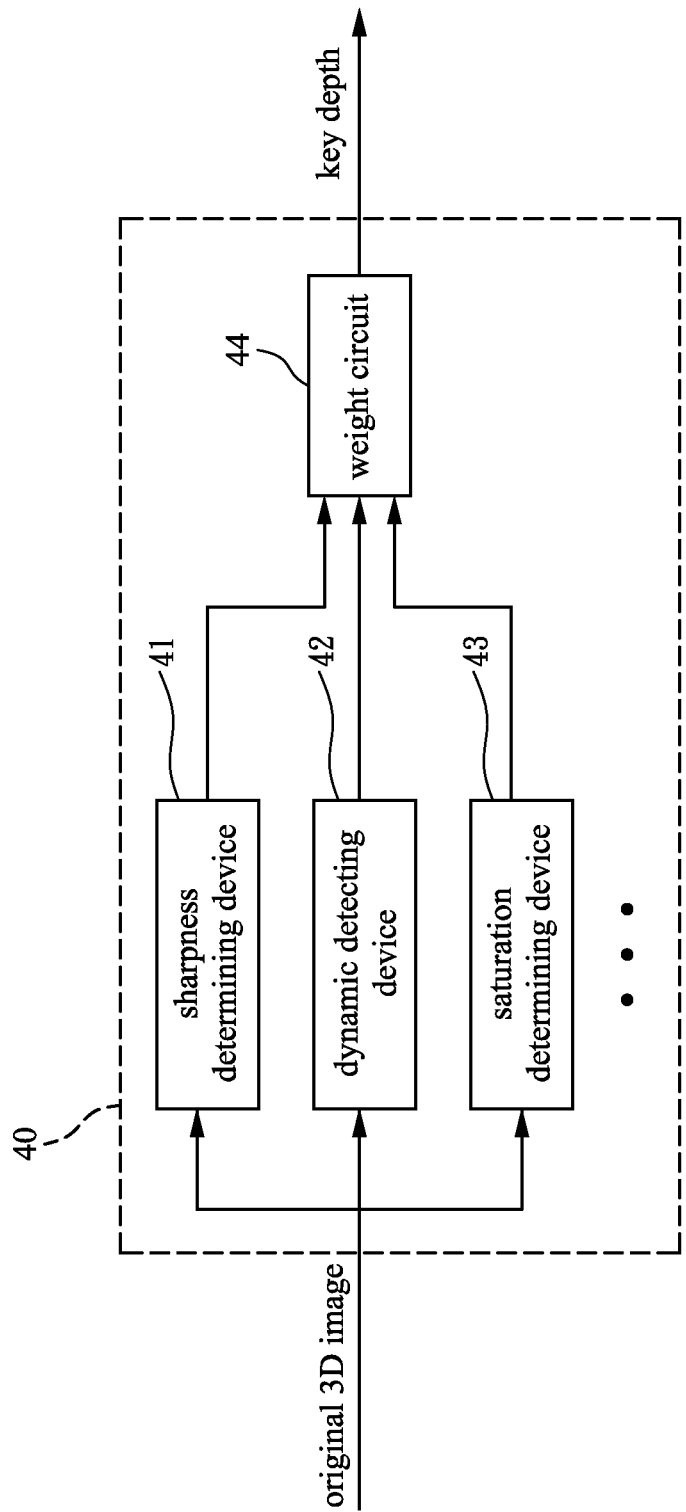
FIG. 4 illustrates a block diagram of the image analyzing device according one embodiment of the present invention.

FIG. 4 illustrates a block diagram of the image analyzing device according one embodiment of the present invention. The image analyzing device 4 may include a sharpness determining device 41 for determining the highest sharpness area in the original image to generate a first key information; a dynamic detecting device 42 for detecting a static object relative to the frame background of fast-moving in the original 3D image to generate the key information or a major moving object to generate a second key information; a saturation determining device 43 for determining the highest saturation area in the conventional 3D image to generate a third key information. For example, the highest sharpness area in the general video or image is usually defined as the key area in the video or image; alternatively, the major moving object in the video or a static object relative to the frame background of fast-moving image is defined as the key area in the video or image; alternatively, the highest color saturation area in the video or image is usually defined as the key area in the video or image. The image analyzing device 40 provided by the present invention generates a first, second and third key information according to the sharpness determination, dynamic detection and saturation determination and then the weight circuit 44 does the weight calculation with the first, second and third key information for determining the key depth of the original 3D image. Expect for the sharpness determination, dynamic detection and saturation determination, there are many ways to determine the key information of the 3D image. Therefore, anyone with ordinary skill in the art can easily understand that, by using the combination with the content disclosed or suggested by the present invention, any modification and combination of the way are still within the scope of the present invention. In other embodiments, the other kinds of detecting and determining will be added or performed in the present invention according to actual design and requirement. In one embodiment, which only use a determining or detecting device (for example, the sharpness determining device 41, the dynamic detecting device 42 or the saturation determining device 43 of the present invention), the weight circuit can be omitted. When the original 3D image has becomes so overly complicated or the content thereof changed causes hardly to decide (for example, cartoon), the image analyzing device 40 firstly makes the different types of analysis to the original 3D image (for example, the sharpness analyze, the color saturation analyze, the dynamic analyze, etc.), and then weight circuit 44 do the weight calculation according to the analyze results so as to determine the key depth. Thereby, the key depth is more accurate.

Figure 5:
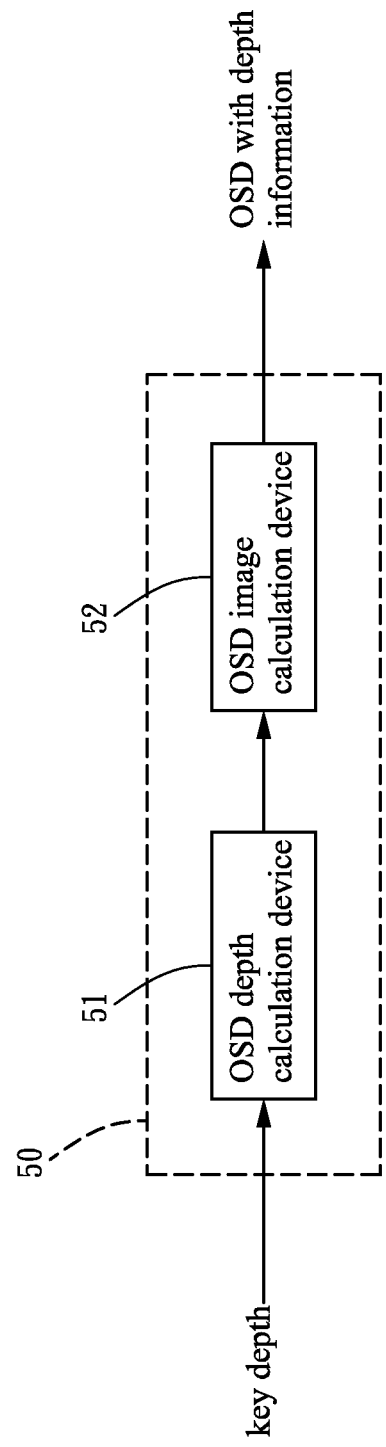
FIG. 5 illustrates a block diagram showing an OSD determining device according to one embodiment of present invention.

FIG. 5 illustrates a block diagram showing an OSD determining device according to one embodiment of present invention. The OSD determining device 50 includes an OSD depth calculation device 51 and an OSD image calculation device 52. The OSD depth calculation device 51 is coupled to the image analyzing device 50 for determining an OSD depth according to the key information from the image analyzing device 50. The OSD depth is attached to the front, the front-edge or middle of the key point in the 3D image. The OSD image calculation device 52 coupled to the OSD depth calculation device 51 calculates and generates the appropriate image format of the OSD with depth according to the OSD depth determined by the OSD depth calculation device 51 and the image format of the original 3D image and then provides the OSD with depth to the superimposing device.

The conventional 3D image is mainly divided to the scene added up the depth, or recording by dual-camcorders, wherein the image information of recording by dual-camcorders includes the right format and the left format. Therefore, the OSD image calculation device 52 calculates the appropriate OSD information according to different input formats. For example, the OSD depth is immediately calculated for generating the OSD with depth and superimposing the original 3D image and the OSD with depth if the format of the original 3D image is the scene and the depth. If the original 3D image includes the formats of the left eye image and the right eye image, it respectively calculates the locations of different OSD depth needed by the right and left eyes according to the key depth, and superimposes the OSD depths of the right eye and the left eye for generating the right image and the left image. The human mind combines the visual image with depth according to the image locations received by the right and left eyes after the human eyes receive the right image and the left image.

Preferably, the OSD is designed as the translucence for lowering effects from other objects on the OSD in the 3D image.

Alterability, the OSD is set on the boundary of the key information for closely following the key point in the 3D image.

Figure 6:
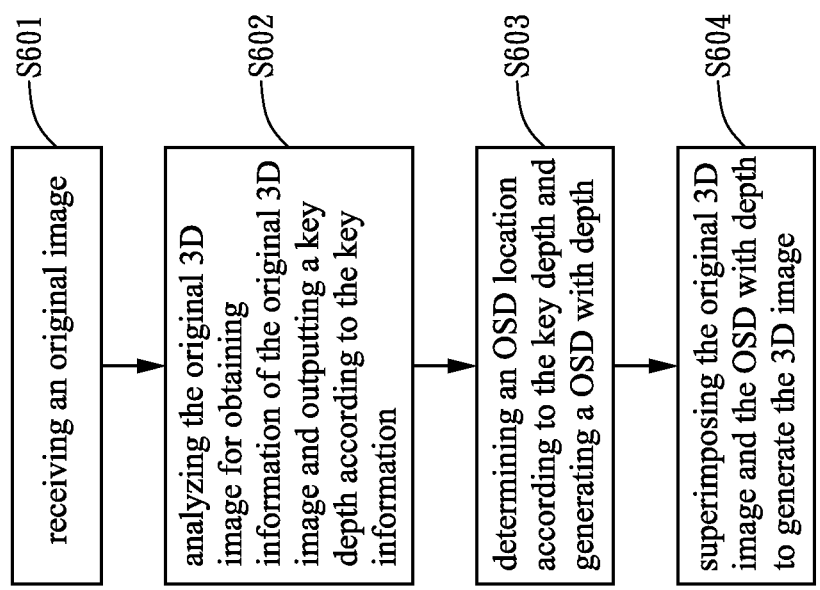
FIG. 6 illustrates a flow chart showing a three dimensional (3D) processing method according to one embodiment of the present invention.

FIG. 6 illustrates a flow chart showing a three dimensional (3D) processing method according to one embodiment of the present invention. The method includes:

S601: receiving an original image;

S602: analyzing the original 3D image for obtaining information of the original 3D image and outputting a key depth according to the key information;

S603: determining an OSD location according to the key depth and generating an OSD with depth; and S604: superimposing the original 3D image and the OSD with depth to generate the 3D image.

Preferably, the S604 further includes a delay step, which comprises:

delaying the original 3D image for a time and superimposing the original 3D image and the OSD with depth for generating the 3D image.

Figure 7:
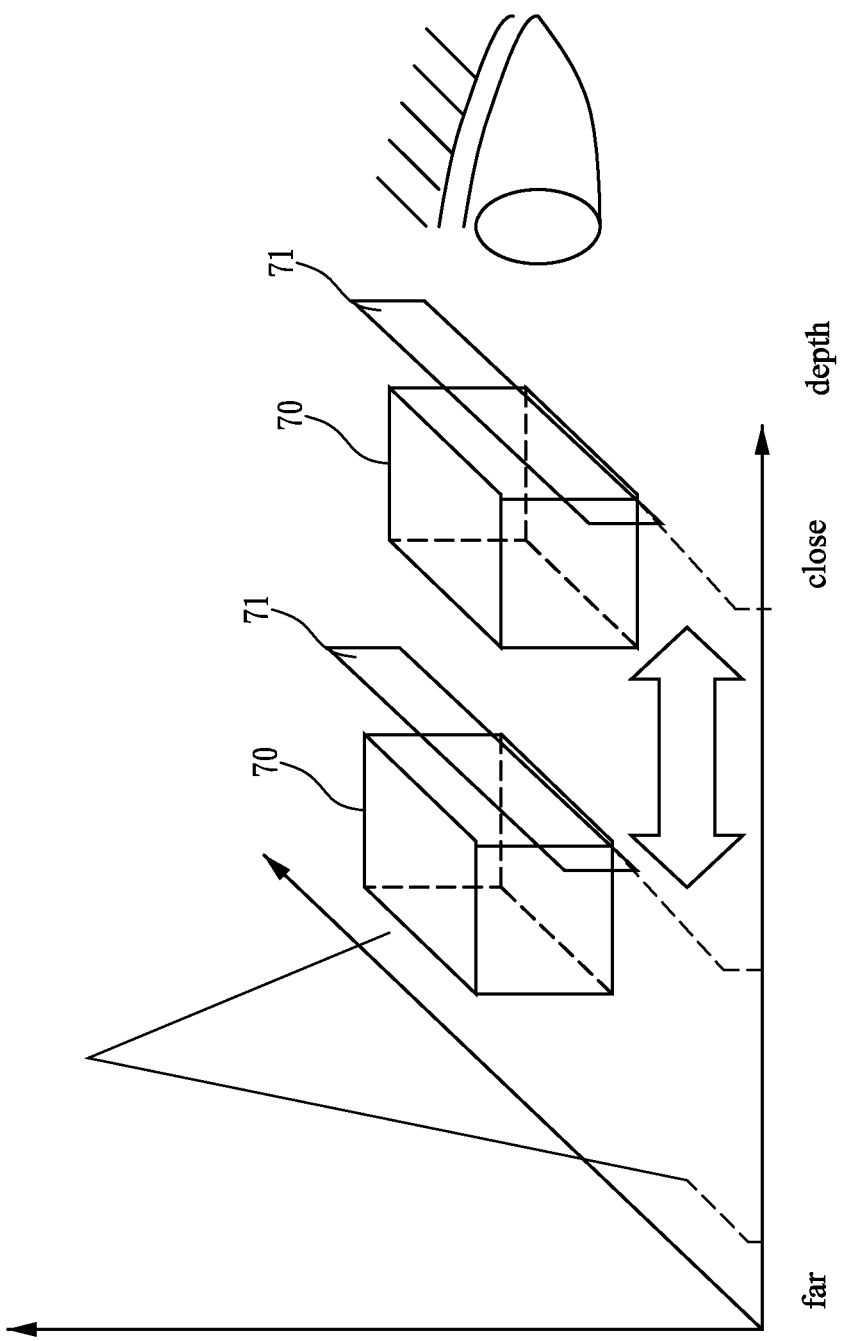
FIG. 7 illustrates one embodiment that the present attaches the subtitle to the top layer of the key point in the 3D image.
Figure 8:
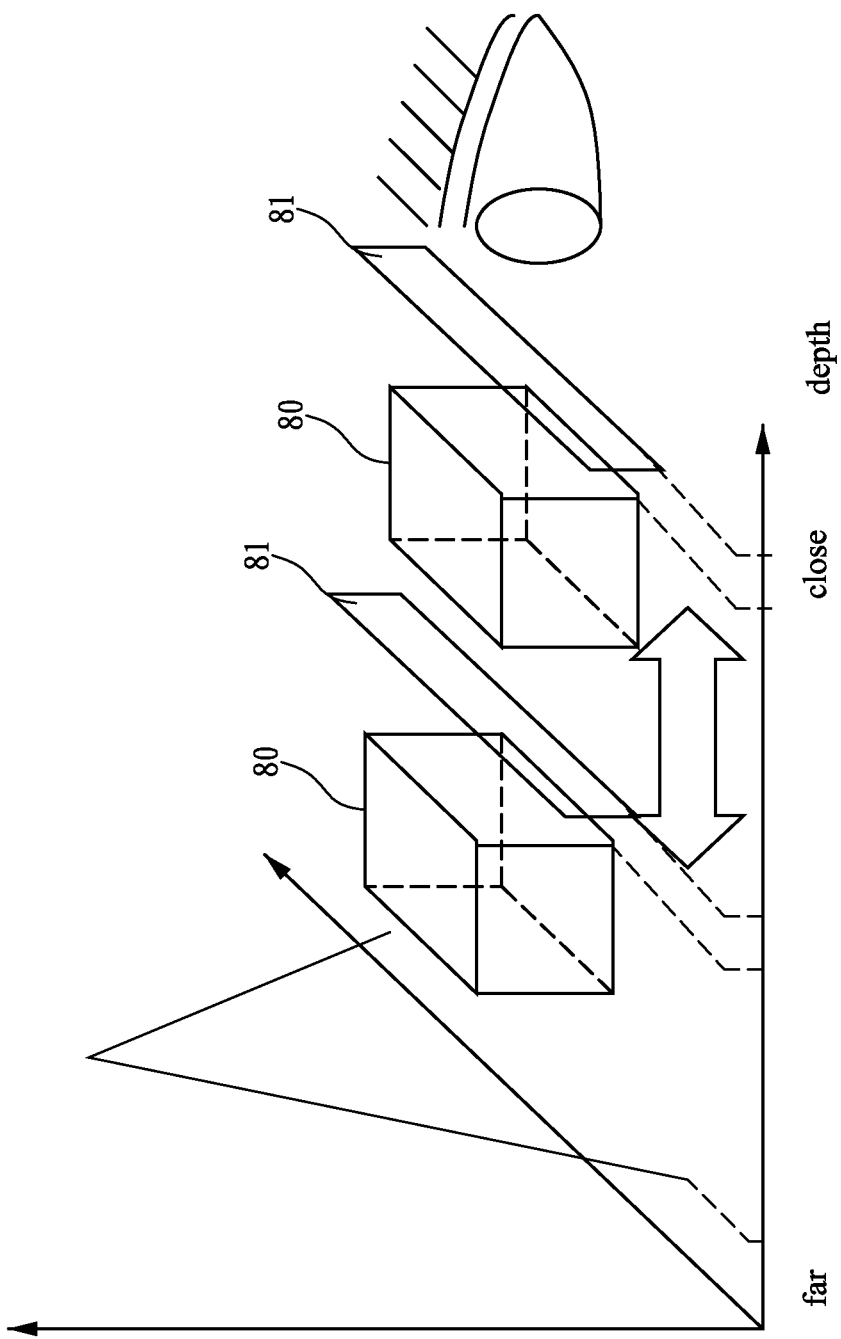
FIG. 8 illustrates one embodiment that the present attaches the subtitle to the front of the key point in the 3D image.
Figure 9:
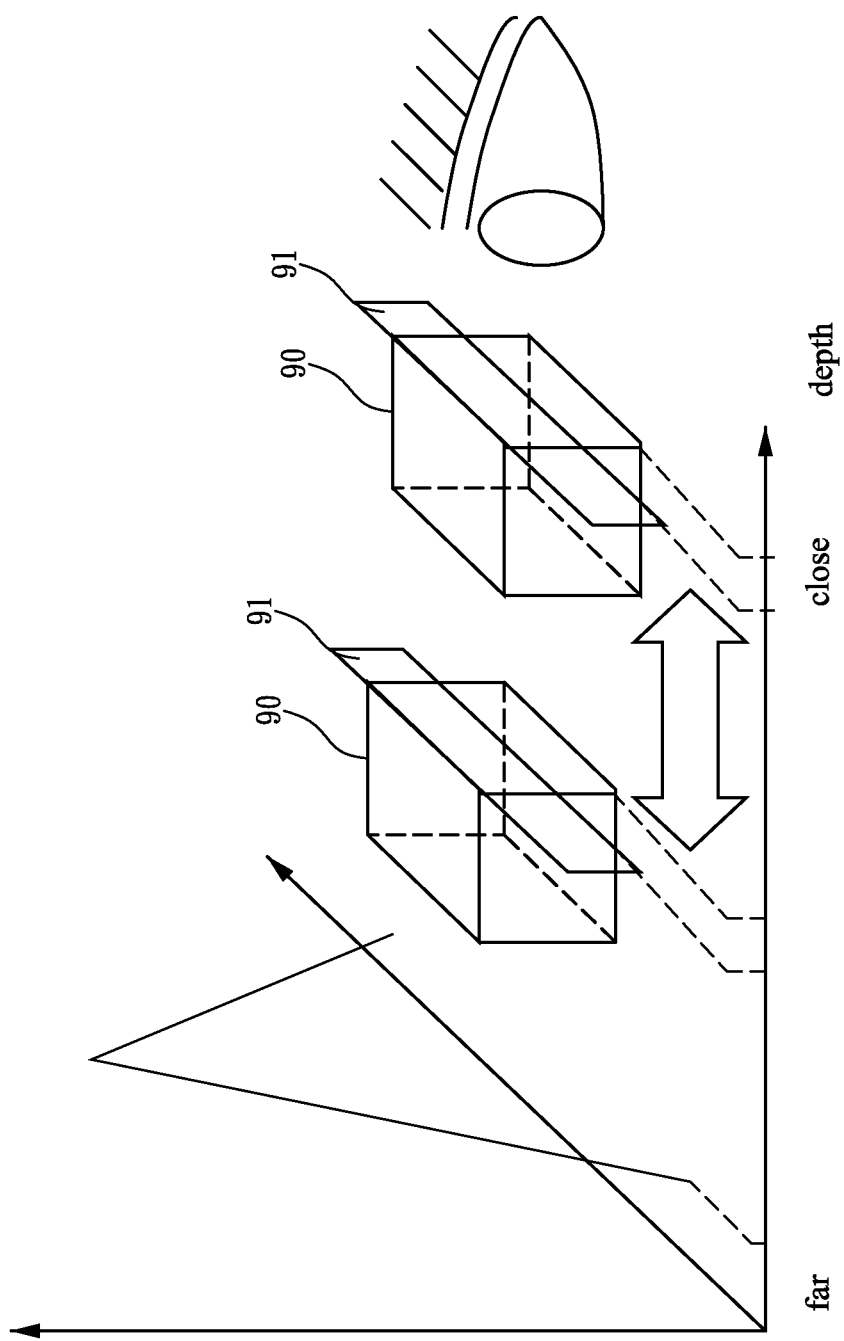
FIG. 9 illustrates one embodiment that the present attaches the subtitle to the middle of the key point in the 3D image.

By the embodiments described above, the user may attach the subtitle depth to the top layer, the front and middle of the key point in the 3D image, as shown in FIGS. 7, 8 and 9. FIG. 7 illustrates one embodiment that the present attaches the subtitle to the top layer of the key point in the 3D image. In the embodiment, whether the key point 70 is close to or far away the eyes, the subtitle 71 is automatically adjusted on the top layer of the key point 70 in the 3D image when user set the subtitle 71 on the top layer of the key point 70 in the 3D image. Therefore, the user does not adjust the focal length looked by double eyes for decrease the fatigue of the user's eyes.

Similarly, FIG. 8 illustrates one embodiment that the present attaches the subtitle to the front of the key point in the 3D image. In the embodiment, whether the key point 80 is close to or far away the eyes, the subtitle 81 is automatically adjusted on the front of the key point 80 in the 3D image when user set the subtitle 81 on the front of the key point 80 in the 3D image. Therefore, the user does not adjust the focal length looked by eyes for decrease the fatigue of the user's eyes.

Similarly, FIG. 9 illustrates one embodiment that the present attaches the subtitle to the middle of the key point in the 3D image. In the embodiment, whether the key point 90 is close to or far away the eyes, the subtitle 91 is automatically adjusted on the middle of the key point 80 in the 3D image when user set the subtitle 91 on the middle of the key point 90 in the 3D image. Therefore, the user does not have to adjust the focal length looked by eyes for decrease the fatigue of the user's eyes.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A three dimensional (3D) processing circuit, configured to process an original 3D image for generating a 3D image, comprising:

an image analyzing device, for analyzing the original 3D image to obtain key information of the original 3D image and outputting a key depth according to the key information, wherein the key depth is a depth of a key point of the original 3D image, and the key point is a major moving object when a background of the original 3D image is static or a major static object when the background of the original 3D image is dynamic;

an on-screen display (OSD) determining device, coupled to the image analyzing device, for determining an OSD location according to the key depth and then generating an OSD with depth according to the OSD location; and a superimposing device, coupled to the OSD determining device, for superimposing the original 3D image and the OSD with depth to generate the 3D image, wherein the OSD location is able to vary with the depth of the key point.

2. The 3D processing circuit as recited in claim 1, further comprising:

a delay device, coupled to the superimposing device, for delaying the original 3D image for a time and then providing the original 3D image to the superimposing device.

3. The 3D processing circuit as recited in claim 1, wherein the OSD determining device further comprises:

an OSD depth calculation device, coupled to the image analyzing device, for determining an OSD depth according to the key depth; and an OSD image calculation device, coupled to the OSD depth calculation device, for calculating the OSD with depth according to the OSD depth and a format of the original 3D image.

4. The 3D processing circuit recited in claim 3, wherein the OSD depth calculation device set an OSD depth in a front, front-edge or middle of the key depth according to the key depth.

5. The 3D processing circuit as recited in claim 1, wherein the image analyzing device further comprises:

a sharpness determining device, for determining a highest sharpness area in the original image to generate the key information.

6. The 3D processing circuit as recited in claim 1, wherein the image analyzing device further comprises:

a dynamic detecting device, for detecting a static object relative to a frame background of fast-moving in the original 3D image to generate the key information.

7. The 3D processing circuit recited in claim 1, wherein the image analyzing device further comprises:

a dynamic detecting device, for detecting a major moving object in the original 3D image to generate the key information.

8. The 3D processing circuit recited in claim 1, wherein the image analyzing device further comprises a saturation determining device, for determining a highest saturation area in a conventional 3D image to generate the key information.

9. The 3D processing circuit recited in claim 1, wherein the image analyzing device further comprises:
- a sharpness determining device, for determining a highest sharpness area in the original 3D image to generate a first key information;
- a dynamic detecting device, for detecting a static object relative to a frame background of fast-moving in the original 3D image to generate the key information or a major moving object, to generate a second key information;
- a saturation determining device, for determining a highest saturation area in a conventional 3D image to generate a third key information; and
- a weight circuit, coupled to the sharpness determining device, the dynamic detecting device and the saturation device, for performing weight calculation to determine the key depth according to the first, second and third key information.

10. The 3D processing circuit recited in claim 1, wherein an OSD comprises the subtitle.

11. The 3D processing circuit recited in claim 1, wherein an OSD is translucence.

12. The 3D processing circuit recited in claim 1, wherein an OSD is set on a boundary of the key information.

13. A three dimensional (3D) processing method executed by a 3D processing circuit for processing an original 3D image to generate a 3D image, the method comprising:
- receiving an original image;
- analyzing the original 3D image for obtaining key information of the original 3D image and outputting a key depth according to the key information, wherein the key depth is a depth of a key point of the original 3D image, and the key point is a major moving object when a background of the original 3D image is static or a major static object when the background of the original 3D image is dynamic;
- determining an OSD location according to the key depth and generating an OSD with depth; and
- superimposing the original 3D image and the OSD with depth to generate the 3D image, wherein the OSD location is able to vary with the depth of the key point.

14. The method recited in claim 13, wherein the step of superimposing the original 3D image and the OSD with depth to generate the 3D image further comprises:
- superimposing the original 3D image and the OSD with depth after delaying the original 3D image for a time.

15. The method recited in claim 13, wherein the step of determining an OSD location according to the key depth and generating an OSD with depth further comprises:
- determining an OSD depth according to the key depth;
- calculating and generating the OSD with depth according to the OSD depth and a format of the original 3D image.

16. The method recited in claim 15, wherein the step of determining an OSD depth according to the key depth comprises:
- setting the OSD depth in a front, front-edge or middle of the key depth.

17. The method recited in claim 13, wherein the step of analyzing the original 3D image for obtaining key information of the original 3D image and outputting a key depth according to the key information further comprises:
- detecting a major moving object in the original 3D image for generating the key information.

18. The method recited in claim 13, wherein the step of analyzing the original 3D image for obtaining key information of the original 3D image and outputting a key depth according to the key information further comprises:
- detecting a static object relative to a frame background of fast-moving in the original 3D image to generate the key information.

19. The method recited in claim 13, wherein the step of analyzing the original 3D image for obtaining key information of the original 3D image and outputting a key depth according to the key information further comprises:
- detecting a highest sharpness area to generate the key information.

20. The method recited in claim 13, wherein the step of analyzing the original 3D image for obtaining key information of the original 3D image and outputting a key depth according to the key information further comprises:
- detecting a highest saturation area to generate the key information.

21. The method recited in claim 13, wherein the step of analyzing the original 3D image for obtaining key information of the original 3D image and outputting a key depth according to the key information further comprises:
- detecting a highest sharpness area to generate a first key information;
- detecting a static object relative to a frame background of fast-moving or a major moving object in the original 3D image to generate a second key information;
- detecting a highest saturation area to generate a third key information; and
- performing weight calculation to determine the key depth according to the first, second and third key information.

22. The method recited in claim 13, wherein an OSD is the subtitle.

* * * * *